(12) United States Patent
Reith et al.

(10) Patent No.: US 12,708,218 B2
(45) Date of Patent: Aug. 18, 2026

(54) MODULAR SEAT BOTTOM CUSHION, AND SEAT ASSEMBLY COMPRISING SUCH A CUSHION

(71) Applicant: FAURECIA Sièges d'Automobile, Nanterre (FR)

(72) Inventors: Carsten Reith, Niedernwöhren (DE); Abhijeet Pharate, Pune (IN); Cédric Ketels, White Lake, MI (US); Didier Duriez, Le Plessis Pate (FR); Swapnil Gathibandhe, Maharashtra (IN); Marine Michaud, Paris (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 292 days.

(21) Appl. No.: 18/399,968

(22) Filed: Dec. 29, 2023

(65) Prior Publication Data

US 2024/0215732 A1 Jul. 4, 2024

(30) Foreign Application Priority Data

Jan. 3, 2023 (FR) ...................................... 2300038

(51) Int. Cl.
*A47C 27/00* (2006.01)
*B60N 2/64* (2006.01)
*B60S 5/00* (2006.01)

(52) U.S. Cl.
CPC ............ *A47C 27/001* (2013.01); *B60N 2/646* (2013.01); *B60S 5/00* (2013.01)

(58) Field of Classification Search
CPC .............................. A47C 27/001; B60N 2/646
USPC ..................................................... 297/440.22
See application file for complete search history.

(56) References Cited

U.S. PATENT DOCUMENTS 4,065,182 A * 12/1977 Braniff .................. B60N 2/686 297/440.22
5,485,976 A * 1/1996 Creed ...................... 297/452.55
7,819,474 B2 10/2010 Gloriosa
8,782,835 B2 * 7/2014 Pozzi .................... B64D 11/06 297/440.22 X
9,764,844 B2 * 9/2017 Le ......................... B60N 2/646
9,796,310 B1 10/2017 Line
10,661,905 B2 * 5/2020 Schumm ............. B60N 2/7005
10,882,432 B1 1/2021 Bosen
2017/0036577 A1 2/2017 Line
(Continued)

FOREIGN PATENT DOCUMENTS

CN 214689127 U 11/2021
DE 202007000484 U1 5/2008
DE 102010007524 A1 8/2011

OTHER PUBLICATIONS

French Search Report for priority French App. No. FR2300038 dated Nov. 30, 2023, 4 pages, No English Translation Available.

*Primary Examiner* — Anthony D Barfield
(74) *Attorney, Agent, or Firm* — Barnes & Thornburg LLP

(57) ABSTRACT

The present disclosure relates to a modular seat bottom cushion, configured to be attached to a seat structure having a seat bottom structure comprising two lateral flanges spaced apart by a front transverse tube and a rear transverse tube, the modular seat bottom cushion comprising, in the assembled state:
- a base comprising a mechanical interface system for attachment to the seat bottom structure,
- padding resting on an upper surface of the base
- a covering which covers the padding.

19 Claims, 7 Drawing Sheets

(56) References Cited

U.S. PATENT DOCUMENTS

Figure 1:
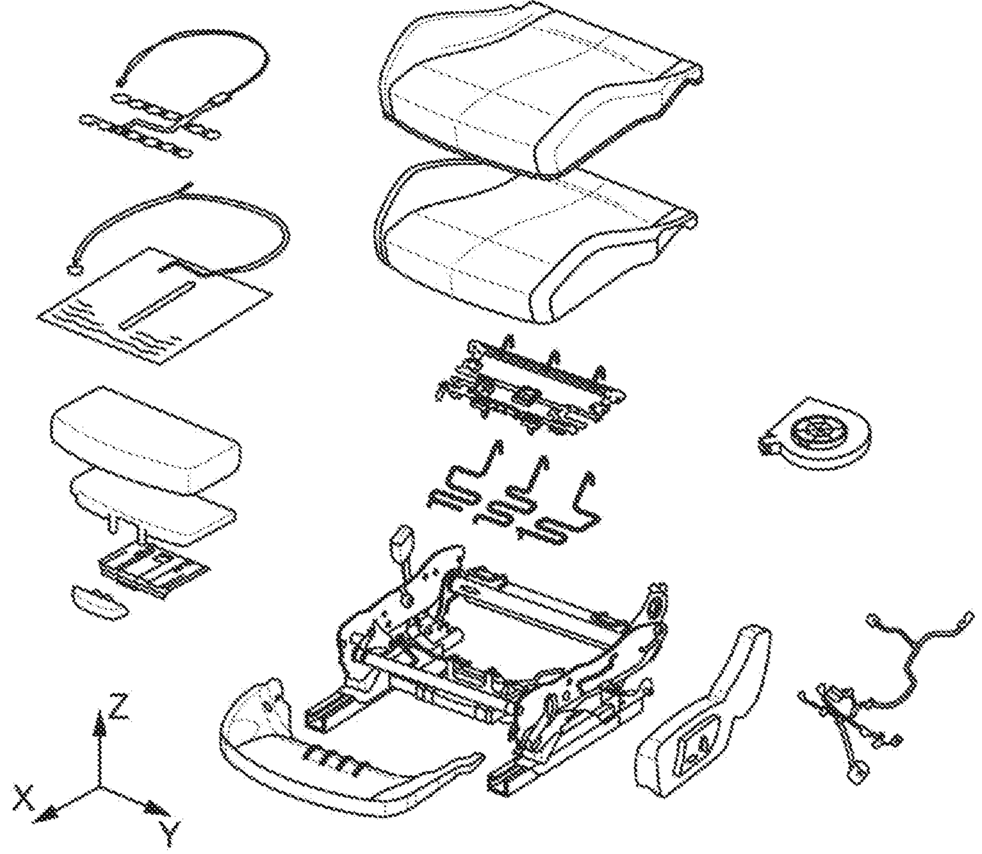

| | | | |
|---|---|---|---|
| 2018/0093598 | A1 | 4/2018 | Higashihara |
| 2020/0231075 | A1 | 7/2020 | Roman |

* cited by examiner 1
14
LG2
140
13

LG1
22
LG1
2

143
LG2
141
21
21
P1

142
144
P2
140
142

22
Z
Y
X

MODULAR SEAT BOTTOM CUSHION, AND SEAT ASSEMBLY COMPRISING SUCH A CUSHION

PRIORITY CLAIM

This application claims priority to French Patent Application No. FR2300038, filed Jan. 3, 2023, which is expressly incorporated by reference herein.

BACKGROUND

The present disclosure relates to the field of vehicle seats.

SUMMARY

According to the present disclosure, a modular seat bottom cushion may be configured to be attached to a seat structure having a seat bottom structure comprising two lateral flanges spaced apart by a front transverse tube and a rear transverse tube, the modular seat bottom cushion comprising, in the assembled state:

a base comprising a mechanical interface system for attachment to the seat bottom structure, padding resting on an upper surface of the base a covering which covers the padding, and wherein the mechanical interface system comprises:

a rear mechanical interface on a rear part of the base, comprising a first open recess, configured to house the rear tube, pivotably around the rear tube, a front mechanical interface, on a front part of the base, configured to house the front tube in a second open recess in a mechanically lockable manner via a locking system of the front mechanical interface, and wherein the mechanical interface system is configured to allow the attachment of the modular seat bottom cushion by the following steps:

/A/ placing the rear mechanical interface opposite the rear tube and inserting the rear tube into the first recess, and /B/ pivoting the modular cushion around the rear tube then fitted into the first recess of the rear mechanical interface until the front tube is inserted into the second recess of the front mechanical interface, and mechanically locking the front tube in the second recess via the system for locking the front mechanical interface.

Such a modular seat bottom cushion according to the present disclosure offers the following advantages, compared to the comparative devices, and in particular:

A simplified assembly of the modular seat bottom cushion on the structure, in particular with assembly and locking kinematics of the modular seat bottom cushion on the seat bottom structure at two attachment points only, consisting respectively of the front tube and the rear tube of the structure.

Such assembly and locking kinematics are quick and intuitive for operators, offering short cycle times. Such assembly and locking kinematics, comprising, in step /A/, prior fitting of the rear tube in the first recess of the rear mechanical interface (namely before the front tube is locked by the locking system of the front mechanical interface), also limits the handling and carrying forces of the modular seat bottom cushion by the operator; such a design advantageously reduces the risks of musculoskeletal disorders.

Such an assembly mode at these two attachment points consisting of the front and rear tubes can also provide a universal nature of the assembly of the modular seat bottom cushion to seat bottom structures of different designs, as long as the seat bottom structures have both the front and rear tubes, and even if the structures have different designs, and for example different flange designs.

Such modular seat bottom cushion assembly and locking kinematics can also allow easy maintenance, and in particular rapid disassembly of the modular seat bottom cushion, in particular without disassembly of the seat bottom structure from a floor of the vehicle.

According to optional features of the present disclosure, taken alone or in combination:

- the locking system can be elastically deformable, configured to allow elastic locking such that locking of the front tube in the second recess is obtained at the end of travel during the pivoting of the modular cushion around the rear tube in step /B/, by elastic deformation of the locking system.
- the first recess may be a U-shaped recess, and/or the second recess may be a U-shaped recess.
- the first recess, in particular U-shaped, can open toward the rear of the base in a rear direction oriented from the front portion toward the rear portion of the base, the first recess, in particular U-shaped, having an upper side wall and an opposite lower side wall, as well as a bottom wall, the recess, in particular U-shaped, being configured so as to provide that the rear tube is held stably against the bottom wall when the base exerts a force on the rear tube directed in the rear direction, the rear tube then being blocked in a direction perpendicular to the base between the upper side wall and the lower side wall.
- the base may be a body, preferably thin, which extends from a rear edge to a front edge, and from a first lateral edge to a second lateral edge, and wherein the first recess, in particular U-shaped, opens toward the rear of the base, and the second recess, in particular U-shaped, opens toward the bottom, and wherein the first recess comprises a first direction of insertion for the rear tube and the second recess comprises a second direction of insertion for the front tube, and wherein the first direction of insertion and the second direction of insertion are inclined relative to one another by an angle of between 45° and 90°.
- the base may be a body obtained by injection molding, and wherein the front mechanical interface and the rear mechanical interface are arranged respectively on the rear part and the front part of the base, integrally with the body, the rear and front mechanical interfaces being obtained during the injection molding.
- according to one embodiment, the locking system of the front mechanical interface can comprise a locking member, articulated by a flexible hinge, at a proximal end to the body of the base relative to the second recess and having a locking tooth at its distal end, as well as a cam secured to the locking member, and wherein the locking member is configured to switch from an unlocked position, leaving the second recess open, to a locked position, closing the second recess, so that in step /B/ the front tube engages the cam, during its insertion into the second recess, by causing the locking member to move around the hinge from the unlocked position to the locked position during which the locking member is elastically deformed by passing a counter-tooth of the mechanical interface, secured to the base, and to the locked position for which the locking member is at least partially relaxed in a position where the locking tooth and the counter-tooth cooperate to prevent the unlocking of the locking member in a position where the locking member holds the front tube captive in the second recess.

according to one embodiment, the locking system of the front mechanical interface can comprise a groove of the second elastically deformable recess having a groove inlet of smaller dimension than the diameter of the front tube, the groove having an inner section adjusted to the section of the front tube of greater dimension than the groove inlet, configured so that during the pivoting in step /B/, the front tube is inserted into the groove inlet by deforming it elastically, and so that once the front tube is received in the second recess of the front mechanical interface, the groove inlet returns elastically to its position while keeping the front tube elastically locked in the second recess according to one embodiment, the base may be an injection molded body and wherein the base comprises a suspension system on a central portion of the base between a first lateral edge and a second lateral edge of the body, and wherein the suspension system is obtained during injection molding and consists of an open elastic portion of the base, extending, over a central portion, between the first lateral edge and the second lateral edge near the rear edge compared to the front edge according to one embodiment, the base may comprise a suspension system on a central portion of the base between a first lateral edge and a second lateral edge of the body and in the suspension system comprises:

a perforated portion of the base, extending, over a central portion, between the first lateral edge and the second lateral edge near the rear edge compared to the front edge, a metal spring system covering the perforated portion, attached to the body of the base on both sides of the perforated portion.

According to one embodiment, the padding may comprise:

a central portion, extending from a rear edge and to a front edge of the base, a first lateral padding, forming a first raised edge, and a second lateral padding, forming a second raised edge, and wherein the first padding and the second padding are arranged on both sides of the central portion.

According to one embodiment, the first lateral padding and the second lateral padding are independent and removable elements relative to the central portion of the padding.

According to one embodiment, the modular cushion may further comprise the assembled state, all or part of the following components:

an electric resistive heating mat, and/or an electric ventilation system, configured to blow air through vents in the base, and/or a massage system, comprising one or more mechanical actuators, and/or a haptic driver system, comprising one or more drivers configured to generate vibrations in the base.

The present disclosure further relates to a seat assembly comprising a modular seat bottom cushion according to the present disclosure and a seat structure having a seat bottom structure comprising two lateral flanges spaced apart by a front transverse tube and a rear transverse tube, and wherein the modular seat bottom cushion comprising, in the assembled state:

the base, comprising the mechanical interface system for attachment to the seat bottom structure, the padding resting on the upper surface of the base the covering covering the padding and wherein the mechanical interface system comprises:

the rear mechanical interface, on the rear part of the base, comprising the first open recess, configured to house the rear tube, pivotably around the rear tube, the front mechanical interface, on a front part of the base, configured to house the front tube, in the second open recess, in a mechanically lockable manner via the locking system, and wherein the mechanical interface system is configured to allow the attachment of the modular cushion by the following steps:

/A/ placing the rear mechanical interface opposite the rear tube and inserting the rear tube into the first recess, and /B/ pivoting the modular cushion around the rear tube fitted into the first recess of the rear mechanical interface until the front tube is inserted into the second recess of the front mechanical interface and mechanically locking the front tube in the second recess via the locking system.

The present disclosure further relates to a method for obtaining a seat assembly according to the present disclosure, in the assembled state, comprising the following steps:

providing a modular seat bottom cushion comprising, in the assembled state, at least one base comprising a mechanical interface system for attaching, to the seat bottom structure, a padding resting on an upper surface of the base and a covering which covers the padding, the mechanical interface system comprising a rear mechanical interface, on a rear part of the base, comprising a first recess configured to house the rear tube, pivotably around the rear tube, and a front mechanical interface on a front part of the base, configured to house the front tube, in a second recess in a lockable manner, providing a seat structure, in the assembled state, comprising a seat bottom structure and a seat back structure, the seat bottom structure comprising two lateral flanges spaced apart by a front transverse tube, and a rear transverse tube, assembling the modular cushion to the seat structure by implementing the following steps:

/A/ placing the rear mechanical interface opposite the rear tube and inserting the rear tube into the first recess, and /B/ pivoting the modular cushion around the rear tube then fitted into the first recess of the rear mechanical interface until the front tube is inserted into the second recess of the front mechanical interface and locking the front mechanical interface via a locking system.

The method for maintaining a seat assembly according to the present disclosure, comprising disassembling the modular cushion from the seat structure, without disassembling the seat structure from a floor of the vehicle by implementing the following steps:

/C/ unlocking the locking system, releasing the front tube from the front mechanical interface and rotating the modular cushion around the rear tube housed in the first recess until the front tube is removed from the second recess, and successively /D/ removing the modular cushion by extracting the rear tube from the first recess of the rear mechanical interface.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a view of a seat bottom assembly that comprises, according to an exploded view, a seat bottom structure that comprises lateral flanges spaced apart by front and rear tubes, thus a front cross-member intended to be attached to the flange above the front tube, the cross-member being shaped to form a support surface to support a seat bottom that comprises numerous components, such as a metal spring suspension, a padding comprising a central portion and raised edges, a seat bottom covering intended to cover the padding, the components of the seat bottom cushion optionally being able to comprise comfort equipment, such as a resistive heating mat, and/or a massage system, and/or a ventilation system comprising an electric fan, the design of the seat bottom assembly being adapted for Just-In-Time (JIT) manufacturing.

Figure 2:
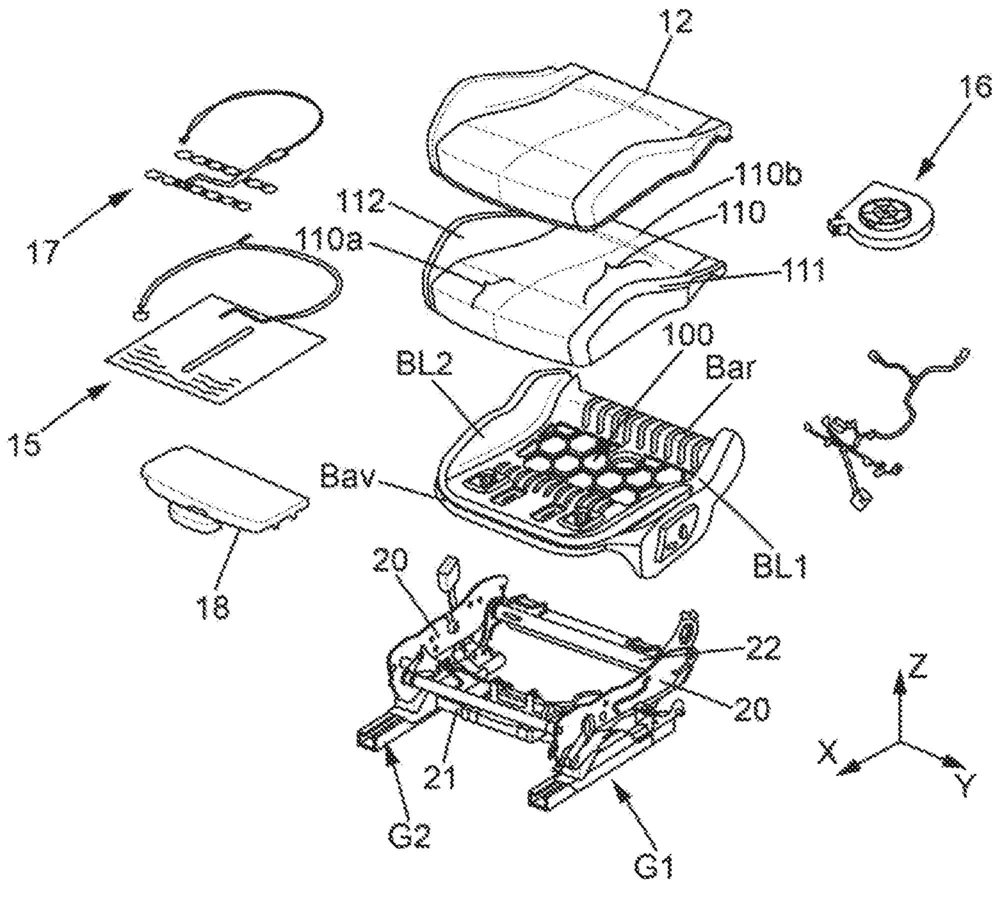

FIG. 2 is a view again showing the same seat bottom structure as FIG. 1 and the pre-assembly of a modular seat bottom cushion that has a molded base, padding, and preferably a covering, or even optionally a resistive heating mat and/or a massage system comprising one or more actuators and/or a fan of a ventilation system; this pre-assembly can be done at a first manufacturing site, and can be conveyed to the final assembly site of the vehicle where the modular seat bottom cushion is assembled to the seat structure.

Figure 3:
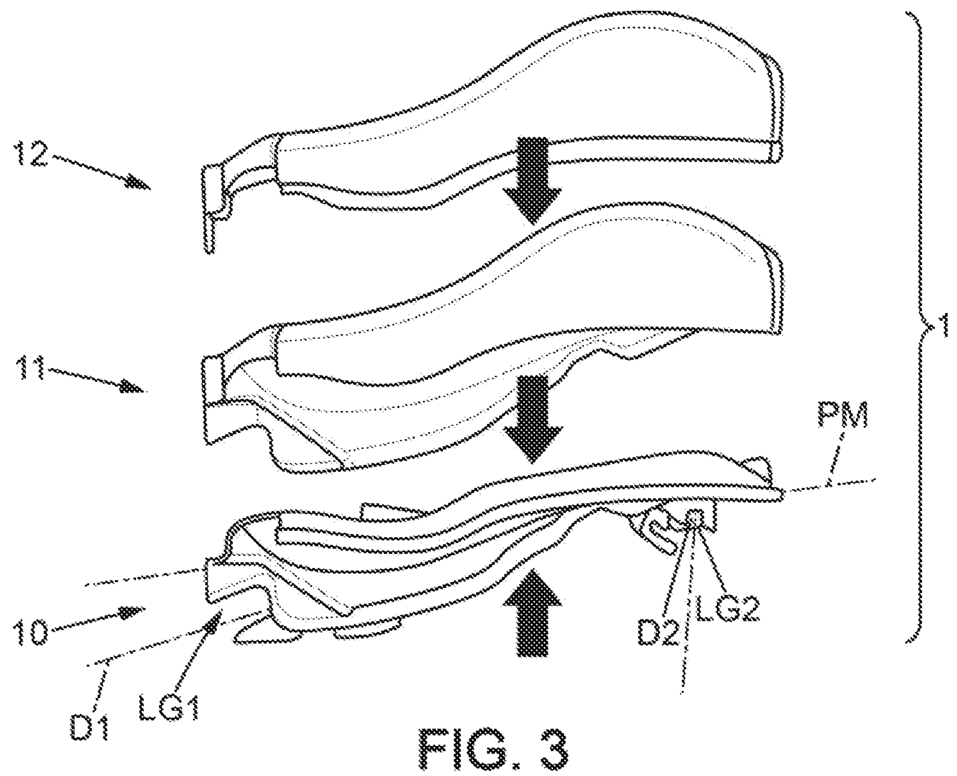

FIG. 3 is a view of the assembly of the modular seat bottom cushion and in particular of its three main components, namely the base, the padding, and the covering, the base, for example, injection molded, having a rear mechanical interface comprising a first U-shaped recess configured to pivotally receive a rear tube of the structure, spacing apart two flanges of the seat bottom structure, and a front mechanical interface, comprising a second recess for a front tube of the seat bottom structure, spacing apart the two flanges, the front mechanical interface allowing locking of the front tube by elastic deformation of the front mechanical interface.

Figure 4:
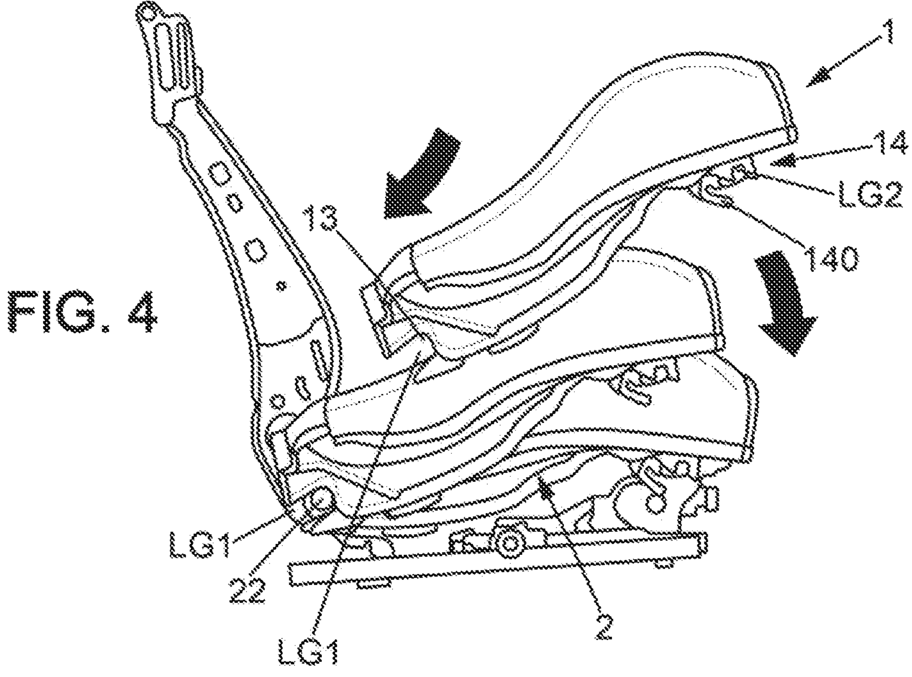

FIG. 4 is a view of the method for assembling the modular seat bottom cushion (in the assembled state) to the seat structure that comprises as steps:

- placing the rear mechanical interface opposite and in line with the rear tube and inserting the rear tube into the first U-shaped recess, and
- pivoting the modular cushion around the rear tube then fitted into the first U-shaped recess of the rear mechanical interface until the front tube is inserted into the second U-shaped recess of the front mechanical interface, and locking the front mechanical interface by elastic deformation.

Figure 5:
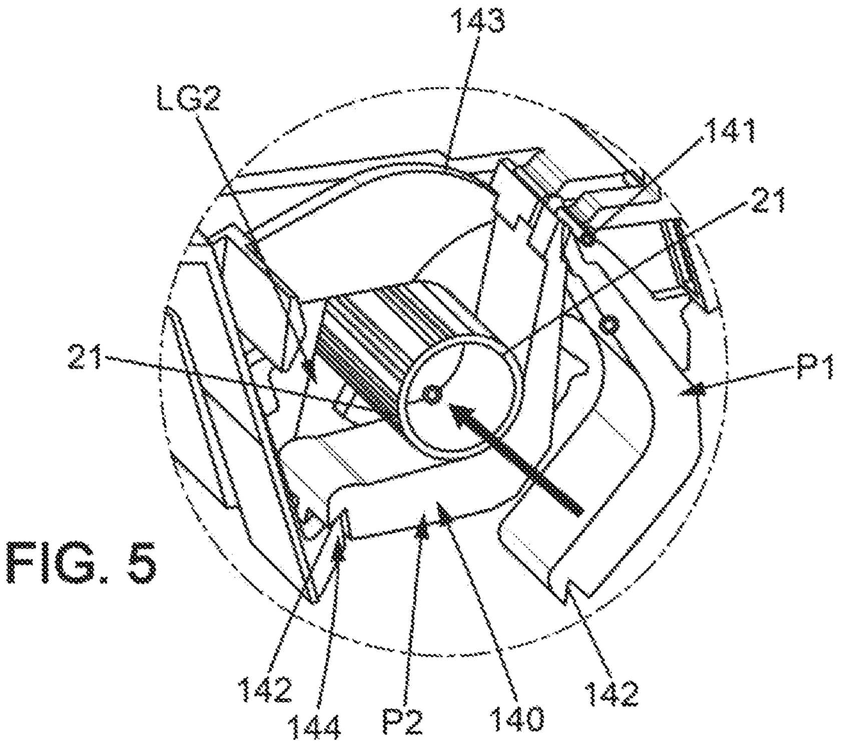

FIG. 5 is a detail view of an elastically deformable locking member of the front mechanical interface, configured to move from an unlocked position to a locked position when a cam has been driven by the front tube, causing the locking member to move around a hinge from the unlocked position to the locked position, during which movement the locking member deforms elastically by passing a counter-tooth of the mechanical interface, secured to the base, and to the locked position for which the elastic member is at least partially relaxed in a position where the locking tooth and the counter-tooth cooperate to prevent the locking member from unlocking in a position where the locking member holds the front tube captive in the second recess.

Figure 6:
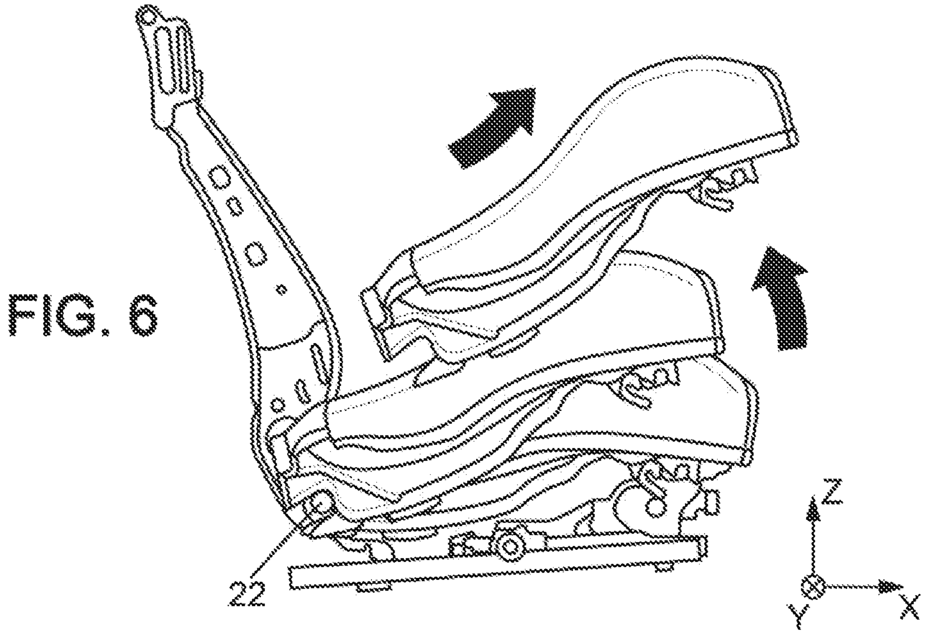

FIG. 6 is a consecutive view showing disassembly by:

- unlocking the front tube by elastic deformation of the front mechanical interface and rotating the modular cushion around the rear tube housed in the first recess until the front tube is removed from the second U-shaped recess, and successively
- removing the modular cushion by extracting the rear tube from the first recess of the rear mechanical interface.

Figure 7:
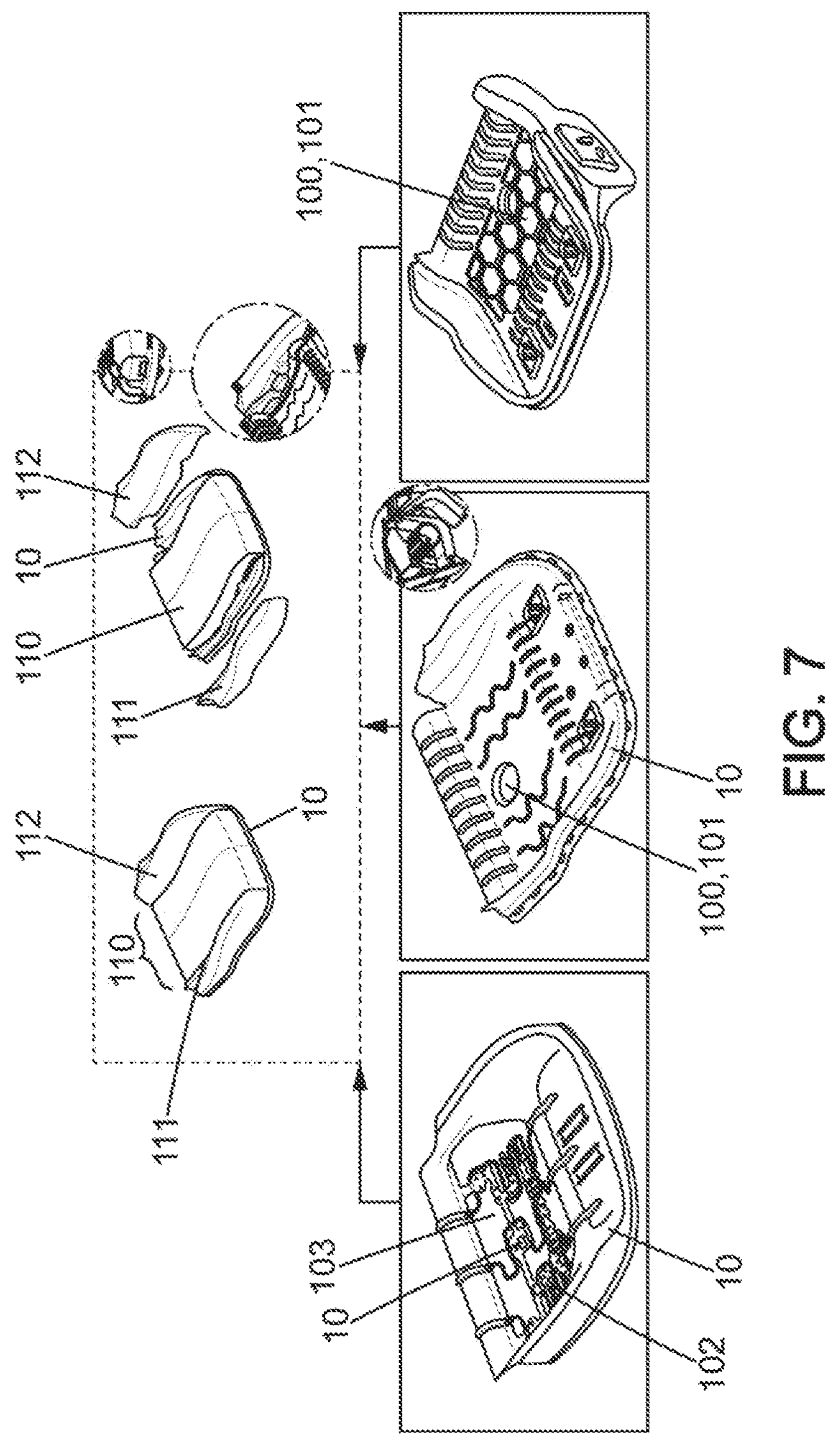

FIG. 7 is a view of different designs of the component of the modular seat bottom cushion, and in particular at the top:

- a first design of the padding on the left for which the central portion of the padding, on the one hand, and the first lateral padding and the second lateral padding, on the other hand, form a unitary padding,
- a second design of the padding on the right for which the central portion of the padding, on the one hand, and the first lateral padding and the second lateral padding, on the other hand, are removable elements, which can be changed independently when they are worn
- and at the bottom, three designs of the base, with a suspension on the left comprising a system with an elastic metal spring, and in the middle and on the right a design wherein the suspension consists of an elastic perforated part of the thermoformable body of the base.

DETAILED DESCRIPTION

The present disclosure relates to a modular seat bottom cushion 1, configured to be attached to a seat structure 2 having a seat bottom structure comprising two lateral flanges 20 spaced apart by a front transverse tube 21 and a rear transverse tube 22.

The modular seat bottom cushion comprises, in the assembled state, at least the following components:

- a base 10 comprising a mechanical interface system for attachment to the seat bottom structure,
- padding 11 resting on an upper surface of the base, and optionally
- a covering 12 which covers the padding.

The base 10 is a body, preferably thin, which extends from a rear edge Bar to a front edge Bay, for example, along the direction X, and from a first lateral edge BL1 to a second lateral edge BL2 in the transverse direction. The base may be a body which is integrally molded, for example, by injection molding techniques. The padding 11 rests on the upper surface of the base.

The profile of the body, seen in a section passing through a plane XZ, may be an upright profile, under normal conditions of use of the vehicle seat, when moving from the rear edge Bar toward the front edge Bay, in particular to the front edge of the body. Such an upright profile provides that the user's hips are held in the seat, by limiting the risks of submarining in the event of a frontal impact.

The profile of the body, seen in a cross section passing through a plane YY, can be concave, the first lateral edge BL1 and the second lateral edge BL2 being raised along the direction Z relative to a central portion of the body between the two lateral edges Bl1, Bl2.

The base 10 may comprise a suspension system 100, for example, provided on a central portion of the base 10 between the first lateral edge BL1 and the second lateral edge BL2 of the body.

According to one embodiment shown on the right and in the center in FIG. 7, the suspension system 100 is obtained during injection molding, and may consist of a perforated elastic portion 101 of the base, for example, extending, over a central portion, between the first lateral edge BL1 and the second lateral edge BL12 near the rear edge Bar compared with the front edge Bay, namely the suspension system is situated, in particular along the direction X, closer to the rear edge Bar than the front edge Bav.

According to another embodiment, the base 10 may comprise a suspension system 100 that may extend over a central portion of the base between the first lateral edge and a second lateral edge of the body.

The suspension system 10 can comprise:

- a perforated portion 102 of the base, extending, over a central portion, between the first lateral edge and the second lateral edge near the rear edge compared to the front edge
- a metal spring system 103, covering the perforated portion, attached to the body of the base on both sides of the perforated portion 102.

Notably, the mechanical interface system comprises:

- a rear mechanical interface 13 on a rear part of the base 10, comprising a first open recess LG1, configured to house the rear tube, pivotably around the rear tube 22,
- a front mechanical interface 14, on a front part of the base 10, configured to house the front tube 21, in a second open recess LG2. The front mechanical interface further comprises a mechanical locking system configured to provide the locking of the front tube 21 in the second recess LG2.

The function of the first recess LG1 is to allow, in step /A/, the insertion of the rear tube 22, and to allow the modular seat bottom cushion to pivot around the rear tube 22 securely, while this rear tube 22 is fitted into the first recess LG1.

Once the front tube 21 is received in the second recess LG2 and locked, the design of the first recess LG1 prevents the rear tube 22 from escaping, since the latter is blocked in the first recess LG1.

The first recess LG1 may, for example, be a U-shaped (or C-shaped) recess having a bottom wall and side walls, and/or the second recess LG2 may, for example, be a U-shaped (or C-shaped) recess having a bottom wall and side walls. However, other recess shapes can be envisaged for the first recess LG1 and/or the second recess LG2, for example recesses of polygonal cross sections, for example rectangular, pentagonal or the like.

In general, the first U-recess, in particular U-shaped, referenced LG1 can open toward the rear of the base 10 in a rear direction oriented from the front portion toward the rear portion of the base 10. The first recess, in particular U-shaped, referenced LG1 has an upper side wall and an opposite lower side wall, as well as a bottom wall. Such a first recess, in particular U-shaped, is configured so as to provide stable holding of the rear tube 22 against the bottom wall when the base 10 exerts a force on the rear tube 22 directed in the rear direction, the rear tube 22 then being blocked in a direction perpendicular to the base between the lower and upper side walls.

The first recess LG1, in particular U-shaped, can open toward the rear, substantially along the direction of a mean plane PM, in a direction which is slightly inclined relative to the mean plane of the base 2, for example, by + or −30°. The second recess LG2, in particular U-shaped, can open toward the bottom, for example, in a direction perpendicular to the mean plane PM of the base, or slightly inclined relative to this plane, for example, by + or −30°.

Thus, the first recess LG1, particularly U-shaped, may comprise a first insertion direction D1 for the rear tube 22, extending along the direction of a mean plane PM, in a direction which is slightly inclined relative to the mean plane of the base 2, for example, by + or −30°, and the second recess LG2, particularly U-shaped, may comprise a second insertion direction D2 for the front tube 21, in a direction which is perpendicular to the mean plane PM of the base, or slightly inclined relative to this direction, for example, by + or −30°. The first insertion direction D1 and the second insertion direction D2 are inclined relative to one another by an angle, for example, between 45° and 90°.

The first recess LG1, particularly U-shaped, can be formed by a continuous groove in the transverse direction, or formed by several elements, in particular U-shaped, discretely spaced along the transverse direction Y. The second recess LG2, particularly U-shaped, can be formed by a continuous groove in the transverse direction Y, or formed by several elements, in particular U-shaped, discretely spaced along the transverse direction Y. The different walls of the U (in particular the side walls and the bottom wall) may be provided at least locally in the transverse direction Y, or can be broken down along the transverse direction, namely the first side wall, the second side wall and the bottom wall can respectively extend along several discontinuous sections in the transverse direction Y (embodiment not shown).

The padding 11 imparts the softness and comfort of the seat bottom, and can be from a material such as expanded polyurethane foam.

The padding can comprise:

- a central portion 110, extending from a rear edge and to a front edge of the base:
- a first lateral padding 111, forming a first raised edge, and
- a second lateral padding 112, forming a second raised edge.

The first padding 111 and the second padding 112 are arranged on both sides of the central portion 112, along the transverse direction Y, and have the function of providing lateral retention of the occupant.

In general, the padding 11, including the central portion 110, the first lateral padding 111 and the second lateral padding 112 can be formed by an element in a single piece, and in particular as shown in the top view on the left in FIG. 7.

According to one variant, the first lateral padding 111 and/or the second lateral padding 112 can be independent and removable elements relative to the central portion 110 of the padding 11. In the event of maintenance, it is thus possible to change only the worn element of the padding while retaining the others: for example, it is possible to change the first lateral padding 111 and/or the second lateral padding 112, which tend to wear more quickly, while retaining the central portion 110.

The central portion of the padding may further comprise a fixed rear portion **110*b* and a movable front portion 110*a*. The rear portion 110*b* is attached to the base 10 while a slide system 18 can be provided between the base 10 and the front portion 110*a*. This slide system makes it possible to advance or retract the front portion 110*a* of the central portion 110 relative to the rear portion 110*b***.

The modular cushion may further comprise the assembled state, all or part of the following components:

- an electric resistive heating mat 15, and/or
- an electric ventilation system 16, configured to blow air through vents in the base, and/or
- a massage system 17, comprising one or more mechanical actuators, and/or a haptic driver system, comprising one or more drivers configured to generate vibrations in the base.

According to one embodiment, the base 10 may be a body obtained by injection molding; the front mechanical interface 14 and the rear mechanical interface 13 may be arranged respectively on the rear part and the front part of the base 10, and be integral with the body, the rear and front mechanical interfaces 13, 14 being obtained during the injection molding. Alternatively, the front mechanical interface 14 and/or the rear mechanical interface 13 can be formed by elements attached to the body of the base 10.

According to the present disclosure, the mechanical interface system is advantageously configured to allow the attachment of the modular seat bottom cushion by the following steps:

/A/ placing the rear mechanical interface opposite the rear tube 22 and inserting the rear tube 21 into the first U-shaped recess LG1, and /B/ pivoting the modular cushion 1 around the rear tube 22 then fitted into the first recess LG1 of the rear mechanical interface 13 until the front tube 21 is inserted into the second recess LG2 of the front mechanical interface and mechanically locking the front tube (21) via the locking system.

The placement and attachment of the modular seat bottom cushion to the seat structure according to the present disclosure are quick, safe and carried out preferably without a tool, in particular for steps /A/ and /B/.

In general, the mechanical locking of the front tube 21 may require an additional operation by the user upon the (simple) pivoting in step /B/, for example, a movement of a latch of the locking system by way of a non-limiting example, or the placement of a removable retaining member of the front mechanical interface, such as a retaining tab.

However, and according to an advantageous embodiment, the locking system can be configured to lock automatically during the pivoting in step /B/.

According to such an embodiment, the locking system can be elastically deformable, configured to allow elastic locking such that locking of the front tube 21 in the second recess LG2 of the front mechanical interface is obtained at the end of travel during the pivoting of the modular cushion around the rear tube 21 in step /B/, by elastic deformation of the locking system.

Thus, according to one embodiment (not shown), the second recess LG2, in particular U-shaped, can be an elastically deformable groove having a groove inlet of smaller dimension than the diameter of the front tube 21, the groove having an inner section adjusted to the section of the front tube 21 of dimension larger than the groove inlet. During the pivoting in step /B/, the front tube 21 is inserted into the groove inlet by deforming it elastically. Once the front tube 21 is received in the second recess of the front mechanical interface 14, the groove inlet elastically returns to its position while holding the front tube 21, elastically locked in the second recess LG2.

According to another embodiment, the front mechanical interface 14 may comprise a locking member 140, articulated by a flexible hinge 141, at a proximal end to the body of the base relative to the second recess and having a locking tooth 142 at its distal end, as well as a cam 143 secured to the locking member 140.

The locking member 140 is configured to move from an unlocked position P1, leaving the second recess LG2 open, shown on the right in FIG. 5, to a locked position P2 closing the second recess LG2, shown on the left in FIG. 5.

In step /B/ the front tube 21 engages with the cam 143, during its insertion into the second recess, by causing the locking member 140 to move around the hinge 141 from the unlocked position P1 to the locked position P2: during such a movement, the locking member 140 deforms elastically by passing a counter-tooth 144 of the mechanical interface 14, secured to the base and up to the locked position P2 for which the locking member 140 is at least partially relaxed in a position where the locking tooth 142 and the counter-tooth 144 cooperate with one another to prevent the unlocking of the locking member 140 in a position where the locking member tooth 140 holds the front tube 21 captive in the second recess LG2.

The locking member 140 may have an L-shape, the hinge 141 being provided at one end of the L, the locking tooth at an opposite end of the L. The cam may comprise an arm which extends generally parallel with the lower help of the L and so that the front tube 21 is housed between the cam and the lower wing of the L during the driving of the cam.

The present disclosure also relates to a seat assembly comprising a modular seat bottom cushion 1 and a seat structure 2 having a seat bottom structure comprising two lateral flanges 30 spaced apart by a front transverse tube 21 and a rear transverse tube 23, or even a seat back structure.

The modular seat bottom cushion comprises, in the assembled state:

the base 10, comprising a mechanical interface system for attachment to the seat bottom structure, the padding 11 resting on an upper surface of the base the covering 12, covering the padding.

The mechanical interface system comprises:

the rear mechanical interface 13, on a rear part of the base, comprising the first open recess LG1, configured to house the rear tube, pivotably around the rear tube 22, the front mechanical interface 14, on a front part of the base, configured to house the front tube, in the second open recess LG2, in a mechanically lockable manner.

The mechanical interface system is configured to allow the attachment of the modular cushion by the following steps:

/A/ placing the rear mechanical interface 13 opposite the rear tube 22 and inserting the rear tube into the first recess LG1, and /B/ pivoting the modular cushion around the rear tube 22 then fitted into the first recess LG1, in particular U-shaped, of the rear mechanical interface until the front tube 21 is inserted into the second recess LG2, in particular U-shaped, of the front mechanical interface and mechanically locking the front mechanical interface 14 via the locking system.

In general, the mechanical locking may require an additional user operation upon the simple pivoting, for example, a movement of a latch of the locking system, or the placement of a retaining member.

However, and according to one embodiment, the locking system can be configured to lock automatically during the pivoting in step /B/.

According to such an embodiment, the locking system can be elastically deformable, configured to allow elastic locking such that locking of the front tube 21 in the second recess LG2 of the front mechanical interface is obtained at the end of travel during the pivoting of the modular cushion around the rear tube 21 in step /B/, by elastic deformation of the locking system.

The present disclosure further relates to a method for obtaining a seat assembly according to the present disclosure, in the assembled state (namely of the modular cushion to the seat bottom structure) comprising the following steps:

providing a modular seat bottom cushion 1 comprising, in the assembled state, at least one base 10 comprising a mechanical interface system for attaching, to the seat bottom structure, a padding 11 resting on an upper surface of the base, or even a covering 12 which covers the padding, the mechanical interface system comprising a rear mechanical interface 13, on a rear part of the base, comprising a first recess LG1 configured to house the rear tube 22, pivotably around the rear tube 22, and a front mechanical interface 14 on a front part of the base, configured to house the front tube 21, in a second recess LG2 in a lockable manner, providing a seat structure 2, in the assembled state, comprising a seat bottom structure and a seat back structure, the seat bottom structure comprising two lateral flanges 20 spaced apart by a front transverse tube 21, and a rear transverse tube 22, assembling the modular cushion to the seat structure by implementing the following steps:

/A/ placing the rear mechanical interface 13 opposite the rear tube 22 and inserting the rear tube 22 into the first recess LG1, and /B/ pivoting the modular cushion 1 around the rear tube 22 then fitted into the first U-shaped recess LG1 of the rear mechanical interface 13 until the front tube 21 is inserted into the second recess LG2 of the front mechanical interface 14 and mechanically locking the front tube LG2 in the second recess via the system for locking the front mechanical interface 14.

The assembly between the modular cushion and the seat structure can also allow rapid disassembly, and benefit a disassembly of the modular cushion without disassembling the seat structure from the floor of the vehicle.

Thus, the present disclosure also relates to a method for maintaining a seat assembly according to the present disclosure, comprising disassembling the modular cushion 1 from the seat structure 2, without disassembling the seat structure from a floor of the vehicle by implementing the following steps:

/C/ unlocking the locking system, releasing the front tube 21 from the front mechanical interface 14 and rotating the modular cushion 1 around the rear tube 22 housed in the first recess LG1 until the front tube 21 is removed from the second U-shaped recess LG2, and successively /D/ removing the modular cushion by extracting the rear tube 22 from the first recess LG1 of the rear mechanical interface 13.

Such a removal of the modular cushion, without disassembling the structure of the seat, allows easy maintenance of the cushion by replacing one or more worn elements, for example replacing one or more linings, by substituting a new modular cushion, or even authorized comfort equipment, such as the resistive heating mat, the ventilation system, or the massage system, or the system comprising one or more haptic drivers.

The present disclosure relates to a modular seat bottom cushion, configured to be attached to a seat structure having a seat bottom structure, as well as a seat assembly comprising a modular seat bottom cushion according to the present disclosure and a seat structure having a seat bottom structure, the seat bottom structure having two lateral flanges spaced apart by a front transverse tube and a rear transverse tube.

The present disclosure further relates to a method for obtaining a seat assembly according to the present disclosure, as well as a method for maintenance of a seat assembly according to the present disclosure.

In comparative vehicle seats, there is a seat design which requires the various components of the seat to be assembled at a site, for example, according to just-in-time (JIT) manufacturing.

The structure of the comparative seat comprises a seat structure, for example, made from metal which comprises a seat bottom structure and a seat back structure.

The comparative seat structure may comprise:

two slides, right and left, each comprising a lower profile, for example, female, which is fixed relative to a floor, and an upper, male profile mounted slidably relative to the lower profile, for example, along a direction X which can be the direction of advance of the vehicle, a seat bottom structure that may comprises two flanges, right and left, spaced apart by tubes, and in particular a front tube spacing the flanges apart on a front portion of the seat bottom structure and a rear tube spacing the flanges apart on a rear portion of the seat bottom structure, the front and rear tubes extending parallel to one another in a transverse direction, a metal nose piece that connects front ends of the flanges and is shaped to form a support surface for supporting the seat bottom cushion.

The height of the seat bottom structure, namely the assembly that comprises the flanges and the nose piece, can be adjusted by a raising system which may comprise a pair of front right and left connecting rods connecting the front tube and the upper profiles of the right and left slides, and a pair of rear right and left connecting rods connecting the rear tube and the upper profiles of the right and left slides.

The seat bottom of such a seat further comprises a suspension system, for example, with spring wires, connecting the nose piece to a rear part of the seat bottom structure, but also a seat bottom padding, for example, expanded polyurethane foam, and a covering which covers the foam padding.

Depending on the options that may be chosen by the end user, various comfort equipment may be provided, such as in particular a resistive heating mat, a massage system, or a ventilation system, or even a sliding mechanism that is attached above the nose piece so as to be able to adjust the forward movement of a front part of the cushion, and relative to a fixed rear portion of the cushion.

A design of a seat according to FIG. 1 requires assembling, for example, manually, a large number of components on the final assembly site of the vehicle, which may not be economically desirable when the assembly site has a high labor cost.

Modern seats, in particular for motor vehicles with superior finishes, can be equipped with additional functions, such as a heating, massage, or ventilation function.

These equipment items are integrated in the factory during the manufacture of the seat, then topped with cushions with their padding and coverings. The seat thus assembled is then attached to the floor of the vehicle.

According to the findings of the inventors, and in motor vehicles equipped with such seats, and when the seat is not provided with such comfort equipment from the start, the design of the comparative seats does not allow disassembly of the seat within the vehicle itself, that is, without disassembling the seat from the floor of the vehicle, in order to improve the seat by adding an additional heating, ventilation, or massage function. Indeed, the addition of such equipment would require the vehicle seat to be removed in order to remove the coverings and the padding, this removal being necessary for such an addition.

However, other comparative seat manufacturing comprises the pre-assembly, for example, on a site distinct from the final assembly site of the vehicle, of a module, and in particular a modular seat bottom cushion. This modular cushion comprises, in the assembled state, a base, padding and a covering. It may be transported to the final assembly site for its assembly to the structure.

Notably, a composite nose piece of the base is articulated to a base body, about a transverse axis of the seat, the nose piece comprising a set of hooks attached to the front tube. In the event of a frontal impact, the possible rotation between the nose piece and the base participates in dissipating the energy during the impact, and favorably supports the hips in order to avoid submarining.

According to the Applicant's findings, the attachment of the module to the seat structure can be improved.

The present disclosure relates to a modular seat bottom cushion, configured to be attached to a seat structure having a seat bottom structure comprising two lateral flanges spaced apart by a front transverse tube and a rear transverse tube, the modular seat bottom cushion comprising, in the assembled state:

- a base comprising a mechanical interface system for attachment to the seat bottom structure,
- padding resting on an upper surface of the base
- a covering which covers the padding,
- and wherein the mechanical interface system comprises:
  - a rear mechanical interface on a rear part of the base, comprising a first open recess, configured to house the rear tube, pivotably around the rear tube,
  - a front mechanical interface, on a front part of the base, configured to house the front tube in a second open recess in a mechanically lockable manner via a locking system of the front mechanical interface,
- and wherein the mechanical interface system is configured to allow the attachment of the modular seat bottom cushion by the following steps:
- /A/ placing the rear mechanical interface opposite the rear tube and inserting the rear tube into the first recess, and
- /B/ pivoting the modular cushion around the rear tube then fitted into the first recess of the rear mechanical interface until the front tube is inserted into the second recess of the front mechanical interface, and mechanically locking the front tube in the second recess via the system for locking the front mechanical interface.

Such a modular seat bottom cushion according to the present disclosure offers the following advantages, compared to comparative devices, and in particular:

A simplified assembly of the modular seat bottom cushion on the structure, in particular with assembly and locking kinematics of the modular seat bottom cushion on the seat bottom structure at two attachment points only, consisting respectively of the front tube and the rear tube of the structure.

Such assembly and locking kinematics are quick and intuitive for operators, offering short cycle times. Such assembly and locking kinematics, comprising, in step /A/, prior fitting of the rear tube in the first recess of the rear mechanical interface (namely before the front tube is locked by the locking system of the front mechanical interface), also limits the handling and carrying forces of the modular seat bottom cushion by the operator; Such a design advantageously reduces the risks of musculoskeletal disorders.

Such an assembly mode at these two attachment points consisting of the front and rear tubes can also provide a universal nature of the assembly of the modular seat bottom cushion to seat bottom structures of different designs, as long as the seat bottom structures have both the front and rear tubes, and even if the structures have different designs, and for example different flange designs.

Such modular seat bottom cushion assembly and locking kinematics can also allow easy maintenance, and in particular rapid disassembly of the modular seat bottom cushion, in particular without disassembly of the seat bottom structure from a floor of the vehicle.

According to optional features of the present disclosure, taken alone or in combination:

- the locking system can be elastically deformable, configured to allow elastic locking such that locking of the front tube in the second recess is obtained at the end of travel during the pivoting of the modular cushion around the rear tube in step /B/, by elastic deformation of the locking system.
- the first recess may be a U-shaped recess, and/or the second recess may be a U-shaped recess.
- the first recess, in particular U-shaped, can open toward the rear of the base in a rear direction oriented from the front portion toward the rear portion of the base, the first recess, in particular U-shaped, having an upper side wall and an opposite lower side wall, as well as a bottom wall, the recess, in particular U-shaped, being configured so as to provide that the rear tube is held stably against the bottom wall when the base exerts a force on the rear tube directed in the rear direction, the rear tube then being blocked in a direction perpendicular to the base between the upper side wall and the lower side wall.
- the base may be a body, preferably thin, which extends from a rear edge to a front edge, and from a first lateral edge to a second lateral edge, and wherein the first recess, in particular U-shaped, opens toward the rear of the base, and the second recess, in particular U-shaped, opens toward the bottom, and wherein the first recess comprises a first direction of insertion for the rear tube and the second recess comprises a second direction of insertion for the front tube, and wherein the first direction of insertion and the second direction of insertion are inclined relative to one another by an angle of between 45° and 90°.
- the base may be a body obtained by injection molding, and wherein the front mechanical interface and the rear mechanical interface are arranged respectively on the rear part and the front part of the base, integrally with the body, the rear and front mechanical interfaces being obtained during the injection molding.
- according to one embodiment, the locking system of the front mechanical interface can comprise a locking member, articulated by a flexible hinge, at a proximal end to the body of the base relative to the second recess and having a locking tooth at its distal end, as well as a cam secured to the locking member, and wherein the locking member is configured to switch from an unlocked position, leaving the second recess open, to a locked position, closing the second recess, so that in step /B/ the front tube engages the cam, during its insertion into the second recess, by causing the locking member to move around the hinge from the unlocked position to the locked position during which the locking member is elastically deformed by passing a counter-tooth of the mechanical interface, secured to the base, and to the locked position for which the locking member is at least partially relaxed in a position where the locking tooth and the counter-tooth cooperate to prevent the unlocking of the locking member in a position where the locking member holds the front tube captive in the second recess.

according to one embodiment, the locking system of the front mechanical interface can comprise a groove of the second elastically deformable recess having a groove inlet of smaller dimension than the diameter of the front tube, the groove having an inner section adjusted to the section of the front tube of greater dimension than the groove inlet, configured so that during the pivoting in step /B/, the front tube is inserted into the groove inlet by deforming it elastically, and so that once the front tube is received in the second recess of the front mechanical interface, the groove inlet returns elastically to its position while keeping the front tube elastically locked in the second recess according to one embodiment, the base may be an injection molded body and wherein the base comprises a suspension system on a central portion of the base between a first lateral edge and a second lateral edge of the body, and wherein the suspension system is obtained during injection molding and consists of an open elastic portion of the base, extending, over a central portion, between the first lateral edge and the second lateral edge near the rear edge compared to the front edge according to one embodiment, the base may comprise a suspension system on a central portion of the base between a first lateral edge and a second lateral edge of the body and in the suspension system comprises:

a perforated portion of the base, extending, over a central portion, between the first lateral edge and the second lateral edge near the rear edge compared to the front edge, a metal spring system covering the perforated portion, attached to the body of the base on both sides of the perforated portion.

According to one embodiment, the padding may comprise:

a central portion, extending from a rear edge and to a front edge of the base, a first lateral padding, forming a first raised edge, and a second lateral padding, forming a second raised edge, and wherein the first padding and the second padding are arranged on both sides of the central portion.

According to one embodiment, the first lateral padding and the second lateral padding are independent and removable elements relative to the central portion of the padding.

According to one embodiment, the modular cushion may further comprise the assembled state, all or part of the following components:

an electric resistive heating mat, and/or an electric ventilation system, configured to blow air through vents in the base, and/or a massage system, comprising one or more mechanical actuators, and/or a haptic driver system, comprising one or more drivers configured to generate vibrations in the base.

The present disclosure further relates to a seat assembly comprising a modular seat bottom cushion according to the present disclosure and a seat structure having a seat bottom structure comprising two lateral flanges spaced apart by a front transverse tube and a rear transverse tube, and wherein the modular seat bottom cushion comprising, in the assembled state:

the base, comprising the mechanical interface system for attachment to the seat bottom structure, the padding resting on the upper surface of the base the covering covering the padding and wherein the mechanical interface system comprises:

the rear mechanical interface, on the rear part of the base, comprising the first open recess, configured to house the rear tube, pivotably around the rear tube, the front mechanical interface, on a front part of the base, configured to house the front tube, in the second open recess, in a mechanically lockable manner via the locking system, and wherein the mechanical interface system is configured to allow the attachment of the modular cushion by the following steps:

/A/ placing the rear mechanical interface opposite the rear tube and inserting the rear tube into the first recess, and /B/ pivoting the modular cushion around the rear tube fitted into the first recess of the rear mechanical interface until the front tube is inserted into the second recess of the front mechanical interface and mechanically locking the front tube in the second recess via the locking system.

The present disclosure further relates to a method for obtaining a seat assembly according to the present disclosure, in the assembled state, comprising the following steps:

providing a modular seat bottom cushion comprising, in the assembled state, at least one base comprising a mechanical interface system for attaching, to the seat bottom structure, a padding resting on an upper surface of the base and a covering which covers the padding, the mechanical interface system comprising a rear mechanical interface, on a rear part of the base, comprising a first recess configured to house the rear tube, pivotably around the rear tube, and a front mechanical interface on a front part of the base, configured to house the front tube, in a second recess in a lockable manner, providing a seat structure, in the assembled state, comprising a seat bottom structure and a seat back structure, the seat bottom structure comprising two lateral flanges spaced apart by a front transverse tube, and a rear transverse tube, assembling the modular cushion to the seat structure by implementing the following steps:

/A/ placing the rear mechanical interface opposite the rear tube and inserting the rear tube into the first recess, and /B/ pivoting the modular cushion around the rear tube then fitted into the first recess of the rear mechanical interface until the front tube is inserted into the second recess of the front mechanical interface and locking the front mechanical interface via a locking system.

The method for maintaining a seat assembly according to the present disclosure, comprising disassembling the modular cushion from the seat structure, without disassembling the seat structure from a floor of the vehicle by implementing the following steps:

/C/ unlocking the locking system, releasing the front tube from the front mechanical interface and rotating the modular cushion around the rear tube housed in the first recess until the front tube is removed from the second recess, and successively /D/ removing the modular cushion by extracting the rear tube from the first recess of the rear mechanical interface.

The present disclosure relates to a modular seat bottom cushion (1), configured to be attached to a seat structure (2) having a seat bottom structure comprising two lateral flanges (20) spaced apart by a front transverse tube (21) and a rear transverse tube (22), the modular seat bottom cushion comprising, in the assembled state:

a base (10) comprising a mechanical interface system for attachment to the seat bottom structure, padding (11) resting on an upper surface of the base a covering (12) which covers the padding, The following numbered clauses include embodiments that are contemplated and non-limiting:

Clause 1. A modular seat bottom cushion (1), configured to be attached to a seat structure (2) having a seat bottom structure comprising two lateral flanges (20) spaced apart by a front transverse tube (21) and a rear transverse tube (22), the modular seat bottom cushion comprising, in the assembled state:

a base (10), comprising a mechanical interface system for attachment to the seat bottom structure, a padding (11) resting on an upper surface of the base, a covering (12) which covers the padding, and wherein the mechanical interface system comprises:

a rear mechanical interface (13) on a rear part of the base (10), comprising a first open recess (LG1), configured to house the rear tube (22), pivotably around the rear tube (22), a front mechanical interface (14), on a front part of the base (10), comprising a second open recess (LG2), configured to house the front tube (21) in a mechanically lockable manner via a locking system of the front mechanical interface (14), and wherein the mechanical interface system is configured to allow the attachment of the modular seat bottom cushion by the following steps:

/A/ placing the rear mechanical interface (13) opposite the rear tube (22) and inserting the rear tube (22) into the first recess (LG1), and /B/ pivoting the modular cushion (1) around the rear tube (22) then fitted into the first U-shaped recess (LG1) of the rear mechanical interface (13) until the front tube (21) is inserted into the second recess (LG2) of the front mechanical interface (14) and mechanically locking the front tube (21) in the second recess (LG2) via the system for locking the front mechanical interface (14).

Clause 2. A modular cushion (1) according to clause 1, wherein the locking system of the front mechanical Interface (14) is elastically deformable, configured to allow elastic locking such that locking of the front tube (21) in the second recess (LG2) is obtained at the end of travel during the pivoting of the modular cushion around the rear tube (21) done in step /B/, by elastic deformation of the locking system.

Clause 3. A modular cushion (1) according to clause 1 or 2, wherein the first recess (LG1) is a U-shaped open recess, and/or the second recess (LG2) is a U-shaped open recess.

Clause 4. The modular cushion (1) according to clause 3, wherein the first U-shaped recess (LG1) opens toward the rear of the base (10) in a rear direction oriented from the front portion toward the rear portion of the base (10), the first U-shaped recess (LG1) having an upper side wall and an opposite lower side wall, as well as a bottom wall, the U-shaped recess being configured so as to provide that the rear tube (22) is held stably against the bottom wall when the base (10) exerts a force on the rear tube (22) directed in the rear direction, the rear tube (22) then being blocked in a direction perpendicular to the base between the upper side wall and the lower side wall.

Clause 5. The modular cushion (1) according to any one of the preceding clauses, wherein the base (10) is a body, preferably thin, which extends from a rear edge (Bar) to a front edge (Bav), and from a first lateral edge (BLl1) to a second lateral edge (BL2), and wherein the first open recess (LG1) opens toward the rear of the base (10), and the second open recess (LG2) opens toward the bottom, and wherein the first recess (LG1) comprises a first direction of insertion (D1) for the rear tube (22) and the second recess (LG2) comprises a second direction of insertion (D2) for the front tube (21), and wherein the first direction of insertion (D1) and the second direction of insertion (D2) are inclined relative to one another by an angle of between 45° and 90°.

Clause 6. The modular cushion (1) according to one of clauses 1 to 5, wherein the base (10) is a body obtained by injection molding, and wherein the front mechanical interface (14) and the rear mechanical interface (13) are arranged respectively on the rear part and the front part of the base (10), integrally with the body, the rear and front mechanical interfaces (13, 14) being obtained during the injection molding.

Clause 7. The modular cushion (1) according to one of clauses 1 to 6, wherein the locking system of the front mechanical interface (14) comprises a locking member (140), articulated by a flexible hinge (141), at a proximal end to the body of the base relative to the second recess and having a locking tooth (142) at its distal end, as well as a cam (143) secured to the locking member (140), and wherein the locking member (140) is configured to switch from an unlocked position (P1), leaving the second recess open, to a locked position (P2), closing the second recess (LG2), so that in step /B/the front tube (21) engages the cam (143), during its insertion into the second recess, by causing the locking member (140) to move around the hinge (141) from the unlocked position (P1) to the locked position (P2) during which the locking member (140) is elastically deformed by passing a counter-tooth (144) of the mechanical interface, secured to the base, and to the locked position (P2) for which the locking member (140) is at least partially relaxed in a position where the locking tooth (142) and the counter-tooth (144) cooperate to prevent the unlocking of the locking member (140) in a position where the locking member (140) holds the front tube (21) captive in the second recess (LG2).

Clause 8. The modular cushion (1) according to clause 2, taken alone or in combination with one of clauses 3 to 6, wherein the locking system of the front mechanical interface (14) comprises a groove of the second elastically deformable recess (LG2) having a groove inlet of smaller dimension than the diameter of the front tube (21), the groove having an inner section adjusted to the section of the front tube (21) of greater dimension than the groove inlet, configured so that during the pivoting in step /B/, the front tube (21) is inserted into the groove inlet by deforming it elastically, and so that once the front tube (21) is received in the second recess of the front mechanical interface (14), the groove inlet returns elastically to its position while keeping the front tube (21) elastically locked in the second recess (LG2).

Clause 9. The modular cushion (1) according to one of clauses 1 to 8, wherein the base is an injection molded body and wherein the base (10) comprises a suspension system (100) on a central portion of the base (10) between a first lateral edge (BL1) and a second lateral edge (BL2) of the body, and wherein the suspension system (100) is obtained during injection molding and consists of an open elastic portion (101) of the base, extending, over a central portion, between the first lateral edge (BL1) and the second lateral edge (BL2) near the rear edge compared to the front edge Clause 10. The modular cushion (1) according to one of clauses 1 to 8, wherein the base (10) comprises a suspension system (100) on a central portion of the base between a first lateral edge and a second lateral edge of the body and in the suspension system (10) comprises:

a perforated portion (102) of the base, extending, over a central portion, between the first lateral edge and the second lateral edge near the rear edge compared to the front edge, a metal spring system (103), covering the perforated portion, attached to the body of the base on both sides of the perforated portion.

Clause 11. A seat assembly comprising a modular seat bottom cushion (1) according to one of clauses 1 to 10 and a seat structure (2) having a seat bottom structure comprising two lateral flanges (20) spaced apart by a front transverse tube (21) and a rear transverse tube (22), and wherein the modular seat bottom cushion comprising, in the assembled state:

the base (10), comprising the mechanical interface system for attachment to the seat bottom structure, the padding (11) resting on the upper surface of the base the covering (12), covering the padding and wherein the mechanical interface system comprises:

the rear mechanical interface (13), on a rear part of the base, comprising the first open recess (LG1), configured to house the rear tube, pivotably around the rear tube (22), the front mechanical interface (14), on a front part of the base, configured to house the front tube, in the second open recess (LG2), in a mechanically lockable manner via the locking system, and wherein the mechanical interface system is configured to allow the attachment of the modular cushion by the following steps:

/A/ placing the rear mechanical interface (13) opposite the rear tube (22) and inserting the rear tube into the first recess (LG1), and /B/ pivoting the modular cushion around the rear tube (22) fitted into the first recess (LG1) of the rear mechanical interface until the front tube (21) is inserted into the second recess (LG2) of the front mechanical interface and mechanically locking the front tube (21) in the second recess (LG2) via the locking system.

Clause 12. A method for obtaining a seat assembly according to the clause 11 in the assembled comprising the following steps:

providing a modular seat bottom cushion (1) comprising, in the assembled state, at least one base (10) comprising a mechanical interface system for attaching, to the seat bottom structure, a padding (11) resting on an upper surface of the base, or a covering (12) which covers the padding, the mechanical interface system comprising a rear mechanical interface (13), on a rear part of the base, comprising a first recess (LG1) configured to house the rear tube (22), pivotably around the rear tube (22), and a front mechanical interface (14) on a front part of the base, configured to house the front tube (21), in a second recess (LG2) in a lockable manner, providing a seat structure (2), in the assembled state, comprising a seat bottom structure and a seat back structure, the seat bottom structure comprising two lateral flanges (20) spaced apart by a front transverse tube (21), and a rear transverse tube (22), assembling the modular cushion to the seat structure by implementing the following steps:

/A/ placing the rear mechanical interface (13) opposite the rear tube (22) and inserting the rear tube (22) into the first recess (LG1)

/B/ pivoting the modular cushion (1) around the rear tube (22) then fitted into the first recess (LG1) of the rear mechanical interface (13) until the front tube (21) is inserted into the second recess (LG2) of the front mechanical interface (14) and locking the front mechanical interface via a locking system (14).

Clause 13. A method for maintaining a seat assembly according to clause 11, comprising disassembling the modular cushion (1) from the seat structure (2), without disassembling the seat structure from a floor of the vehicle by implementing the following steps:

/C/ unlocking the locking system, releasing the front tube (21) from the front mechanical interface (14) and rotating the modular cushion (1) around the rear tube (22) housed in the first recess (LG1) until the front tube (21) is removed from the second recess (LG2), and successively /D/ removing the modular cushion by extracting the rear tube (22) from the first recess (LG1) of the rear mechanical interface (13).

The invention claimed is:

1. A modular seat bottom cushion, configured to be attached to a seat structure having a seat bottom structure comprising two lateral flanges spaced apart by a front transverse tube and a rear transverse tube, the modular seat bottom cushion comprising, in the assembled state:

a base, comprising a mechanical interface system for attachment to the seat bottom structure, a padding resting on an upper surface of the base, a covering which covers the padding, and wherein the mechanical interface system comprises:

a rear mechanical interface on a rear part of the base, comprising a first open recess, configured to house the rear tube, pivotably around the rear tube, a front mechanical interface, on a front part of the base, comprising a second open recess, configured to house the front tube in a mechanically lockable manner via a locking system of the front mechanical interface, and wherein the mechanical interface system is configured to allow the attachment of the modular seat bottom cushion by the following steps:

a. placing the rear mechanical interface opposite the rear tube and inserting the rear tube into the first recess, and b. pivoting the modular cushion around the rear tube then fitted into the first U-shaped recess of the rear mechanical interface until the front tube is inserted into the second recess of the front mechanical interface and mechanically locking the front tube in the second recess via the system for locking the front mechanical interface, and wherein the first recess is a U-shaped open recess, and wherein the first U-shaped recess opens toward the rear of the base in a rear direction oriented from the front portion toward the rear portion of the base, the first U-shaped recess having an upper side wall and an opposite lower side wall, as well as a bottom wall, the U-shaped recess being configured so as to provide that the rear tube is held stably against the bottom wall when the base exerts a force on the rear tube directed in the rear direction, the rear tube then being blocked in a direction perpendicular to the base between the upper side wall and the lower side wall.

2. The modular seat bottom cushion of claim 1, wherein the locking system of the front mechanical interface is elastically deformable, configured to allow elastic locking such that locking of the front tube in the second recess is obtained at the end of travel during the pivoting of the modular cushion around the rear tube done in step b, by elastic deformation of the locking system.

3. The modular seat bottom cushion of claim 2, wherein the locking system of the front mechanical interface comprises a groove of the second elastically deformable recess having a groove inlet of smaller dimension than the diameter of the front tube, the groove having an inner section adjusted to the section of the front tube of greater dimension than the groove inlet, configured so that during the pivoting in step b, the front tube is inserted into the groove inlet by deforming it elastically, and so that once the front tube is received in the second recess of the front mechanical interface, the groove inlet returns elastically to its position while keeping the front tube elastically locked in the second recess.

4. The modular seat bottom cushion of claim 1, wherein the second recess is a U-shaped open recess.

5. The modular seat bottom cushion of claim 1, wherein the base is a body which extends from a rear edge to a front edge, and from a first lateral edge to a second lateral edge, and wherein the first open recess opens toward the rear of the base, and the second open recess opens toward the bottom, and wherein the first recess comprises a first direction of insertion for the rear tube and the second recess comprises a second direction of insertion for the front tube, and wherein the first direction of insertion and the second direction of insertion are inclined relative to one another by an angle of between 45° and 90°.

6. The modular seat bottom cushion of claim 1, wherein the base is a body obtained by injection molding, and wherein the front mechanical interface and the rear mechanical interface are arranged respectively on the rear part and the front part of the base, integrally with the body, the rear and front mechanical interfaces being obtained during the injection molding.

7. The modular seat bottom cushion of claim 1, wherein the locking system of the front mechanical interface comprises a locking member, articulated by a flexible hinge, at a proximal end to the body of the base relative to the second recess and having a locking tooth at its distal end, as well as a cam secured to the locking member, and wherein the locking member is configured to switch from an unlocked position, leaving the second recess open, to a locked position, closing the second recess, so that in step b the front tube engages the cam, during its insertion into the second recess, by causing the locking member to move around the hinge from the unlocked position to the locked position during which the locking member is elastically deformed by passing a counter-tooth of the mechanical interface, secured to the base, and to the locked position for which the locking member is at least partially relaxed in a position where the locking tooth and the counter-tooth cooperate to prevent the unlocking of the locking member in a position where the locking member holds the front tube captive in the second recess.

8. The modular seat bottom cushion of claim 1, wherein the base is an injection molded body and wherein the base comprises a suspension system on a central portion of the base between a first lateral edge and a second lateral edge of the body, and wherein the suspension system is obtained during injection molding and consists of an open elastic portion of the base, extending, over a central portion, between the first lateral edge and the second lateral edge near the rear edge compared to the front edge.

9. The modular seat bottom cushion of claim 1, wherein the base is an injection molded body and wherein the base comprises a suspension system on a central portion of the base between a first lateral edge and a second lateral edge of the body, and wherein the suspension system is obtained during injection molding and comprises an open elastic portion of the base, extending, over a central portion, between the first lateral edge and the second lateral edge near the rear edge compared to the front edge.

10. The modular seat bottom cushion of claim 1, wherein the base comprises a suspension system on a central portion of the base between a first lateral edge and a second lateral edge of the body and in the suspension system comprises:

a perforated portion of the base, extending, over a central portion, between the first lateral edge and the second lateral edge near the rear edge compared to the front edge, a metal spring system, covering the perforated portion, attached to the body of the base on both sides of the perforated portion.

11. A seat assembly comprising the modular seat bottom cushion according to claim 1 and a seat structure having a seat bottom structure comprising two lateral flanges spaced apart by a front transverse tube and a rear transverse tube, and wherein the modular seat bottom cushion comprising, in the assembled state:

the base, comprising the mechanical interface system for attachment to the seat bottom structure, the padding resting on the upper surface of the base the covering, covering the padding and wherein the mechanical interface system comprises:

the rear mechanical interface, on a rear part of the base, comprising the first open recess, configured to house the rear tube, pivotably around the rear tube, the front mechanical interface, on a front part of the base, configured to house the front tube, in the second open recess, in a mechanically lockable manner via the locking system, and wherein the mechanical interface system is configured to allow the attachment of the modular cushion by the following steps:

a. placing the rear mechanical interface opposite the rear tube and inserting the rear tube into the first recess, and b. pivoting the modular cushion around the rear tube fitted into the first recess of the rear mechanical interface until the front tube is inserted into the second recess of the front mechanical interface and mechanically locking the front tube in the second recess via the locking system.

12. A method for obtaining the seat assembly according to claim 11 in the assembled comprising the following steps:

providing a modular seat bottom cushion comprising, in the assembled state, at least one base comprising a mechanical interface system for attaching, to the seat bottom structure, a padding resting on an upper surface of the base, or a covering which covers the padding, the mechanical interface system comprising a rear mechanical interface, on a rear part of the base, comprising a first recess configured to house the rear tube, pivotably around the rear tube, and a front mechanical interface on a front part of the base, configured to house the front tube, in a second recess in a lockable manner, providing a seat structure, in the assembled state, comprising a seat bottom structure and a seat back structure, the seat bottom structure comprising two lateral flanges spaced apart by a front transverse tube, and a rear transverse tube, assembling the modular cushion to the seat structure by implementing the following steps:

a. placing the rear mechanical interface opposite the rear tube and inserting the rear tube into the first recess b. pivoting the modular cushion around the rear tube then fitted into the first recess of the rear mechanical interface until the front tube is inserted into the second recess of the front mechanical interface and locking the front mechanical interface via a locking system.

13. A method for maintaining the seat assembly according to claim 11, comprising disassembling the modular cushion from the seat structure, without disassembling the seat structure from a floor of the vehicle by implementing the following steps:

c. unlocking the locking system, releasing the front tube from the front mechanical interface and rotating the modular cushion around the rear tube housed in the first recess until the front tube is removed from the second recess, and successively d. removing the modular cushion by extracting the rear tube from the first recess of the rear mechanical interface.

14. A modular seat bottom cushion, configured to be attached to a seat structure having a seat bottom structure comprising two lateral flanges spaced apart by a front transverse tube and a rear transverse tube, the modular seat bottom cushion comprising, in the assembled state:

a base, comprising a mechanical interface system for attachment to the seat bottom structure, a padding resting on an upper surface of the base, a covering which covers the padding, and wherein the mechanical interface system comprises:

a rear mechanical interface on a rear part of the base, comprising a first open recess, configured to house the rear tube, pivotably around the rear tube, a front mechanical interface, on a front part of the base, comprising a second open recess, configured to house the front tube in a mechanically lockable manner via a locking system of the front mechanical interface, and wherein the mechanical interface system is configured to allow the attachment of the modular seat bottom cushion by the following steps:

a. placing the rear mechanical interface opposite the rear tube and inserting the rear tube into the first recess, and b. pivoting the modular cushion around the rear tube then fitted into the first U-shaped recess of the rear mechanical interface until the front tube is inserted into the second recess of the front mechanical interface and mechanically locking the front tube in the second recess via the system for locking the front mechanical interface, and wherein the base is a body which extends from a rear edge to a front edge, and from a first lateral edge to a second lateral edge, and wherein the first open recess opens toward the rear of the base, and the second open recess opens toward the bottom, and wherein the first recess comprises a first direction of insertion for the rear tube and the second recess comprises a second direction of insertion for the front tube, and wherein the first direction of insertion and the second direction of insertion are inclined relative to one another by an angle of between 45° and 90°.

15. The modular seat bottom cushion of claim 14, wherein the base is a body obtained by injection molding, and wherein the front mechanical interface and the rear mechanical interface are arranged respectively on the rear part and the front part of the base, integrally with the body, the rear and front mechanical interfaces being obtained during the injection molding.

16. A seat assembly comprising the modular seat bottom cushion according to claim 14 and a seat structure having a seat bottom structure comprising two lateral flanges spaced apart by a front transverse tube and a rear transverse tube, and wherein the modular seat bottom cushion comprising, in the assembled state:

the base, comprising the mechanical interface system for attachment to the seat bottom structure, the padding resting on the upper surface of the base the covering, covering the padding and wherein the mechanical interface system comprises:

the rear mechanical interface, on a rear part of the base, comprising the first open recess, configured to house the rear tube, pivotably around the rear tube, the front mechanical interface, on a front part of the base, configured to house the front tube, in the second open recess, in a mechanically lockable manner via the locking system, and wherein the mechanical interface system is configured to allow the attachment of the modular cushion by the following steps:

a. placing the rear mechanical interface opposite the rear tube and inserting the rear tube into the first recess, and b. pivoting the modular cushion around the rear tube fitted into the first recess of the rear mechanical interface until the front tube is inserted into the second recess of the front mechanical interface and mechanically locking the front tube in the second recess via the locking system.

17. A modular seat bottom cushion, configured to be attached to a seat structure having a seat bottom structure comprising two lateral flanges spaced apart by a front transverse tube and a rear transverse tube, the modular seat bottom cushion comprising, in the assembled state:

a base, comprising a mechanical interface system for attachment to the seat bottom structure, a padding resting on an upper surface of the base, a covering which covers the padding, and wherein the mechanical interface system comprises:

a rear mechanical interface on a rear part of the base, comprising a first open recess, configured to house the rear tube, pivotably around the rear tube, a front mechanical interface, on a front part of the base, comprising a second open recess, configured to house the front tube in a mechanically lockable manner via a locking system of the front mechanical interface, and wherein the mechanical interface system is configured to allow the attachment of the modular seat bottom cushion by the following steps:

a. placing the rear mechanical interface opposite the rear tube and inserting the rear tube into the first recess, and b. pivoting the modular cushion around the rear tube then fitted into the first U-shaped recess of the rear mechanical interface until the front tube is inserted into the second recess of the front mechanical interface and mechanically locking the front tube in the second recess via the system for locking the front mechanical interface and wherein the locking system of the front mechanical interface comprises a locking member, articulated by a flexible hinge, at a proximal end to the body of the base relative to the second recess and having a locking tooth at its distal end, as well as a cam secured to the locking member, and wherein the locking member is configured to switch from an unlocked position, leaving the second recess open, to a locked position, closing the second recess, so that in step b the front tube engages the cam, during its insertion into the second recess, by causing the locking member to move around the hinge from the unlocked position to the locked position during which the locking member is elastically deformed by passing a counter-tooth of the mechanical interface, secured to the base, and to the locked position for which the locking member is at least partially relaxed in a position where the locking tooth and the counter-tooth cooperate to prevent the unlocking of the locking member in a position where the locking member holds the front tube captive in the second recess.

18. The modular seat bottom cushion of claim 17, wherein the base is a body obtained by injection molding, and wherein the front mechanical interface and the rear mechanical interface are arranged respectively on the rear part and the front part of the base, integrally with the body, the rear and front mechanical interfaces being obtained during the injection molding.

19. A seat assembly comprising the modular seat bottom cushion according to claim 17 and a seat structure having a seat bottom structure comprising two lateral flanges spaced apart by a front transverse tube and a rear transverse tube, and wherein the modular seat bottom cushion comprising, in the assembled state:

the base, comprising the mechanical interface system for attachment to the seat bottom structure, the padding resting on the upper surface of the base the covering, covering the padding and wherein the mechanical interface system comprises:

the rear mechanical interface, on a rear part of the base, comprising the first open recess, configured to house the rear tube, pivotably around the rear tube, the front mechanical interface, on a front part of the base, configured to house the front tube, in the second open recess, in a mechanically lockable manner via the locking system, and wherein the mechanical interface system is configured to allow the attachment of the modular cushion by the following steps:

a. placing the rear mechanical interface opposite the rear tube and inserting the rear tube into the first recess, and b. pivoting the modular cushion around the rear tube fitted into the first recess of the rear mechanical interface until the front tube is inserted into the second recess of the front mechanical interface and mechanically locking the front tube in the second recess via the locking system.

* * * * *